3,139,002
TRACER SYSTEM AND MECHANISM THEREFOR FOR PROFILE OR SCANNING OPERATIONS
Wendell I. Evans, Cincinnati, Ohio, assignor to The Cincinnati Milling Machine Co., Cincinnati, Ohio, a corporation of Ohio
Filed Mar. 1, 1961, Ser. No. 92,642
4 Claims. (Cl. 90—62)

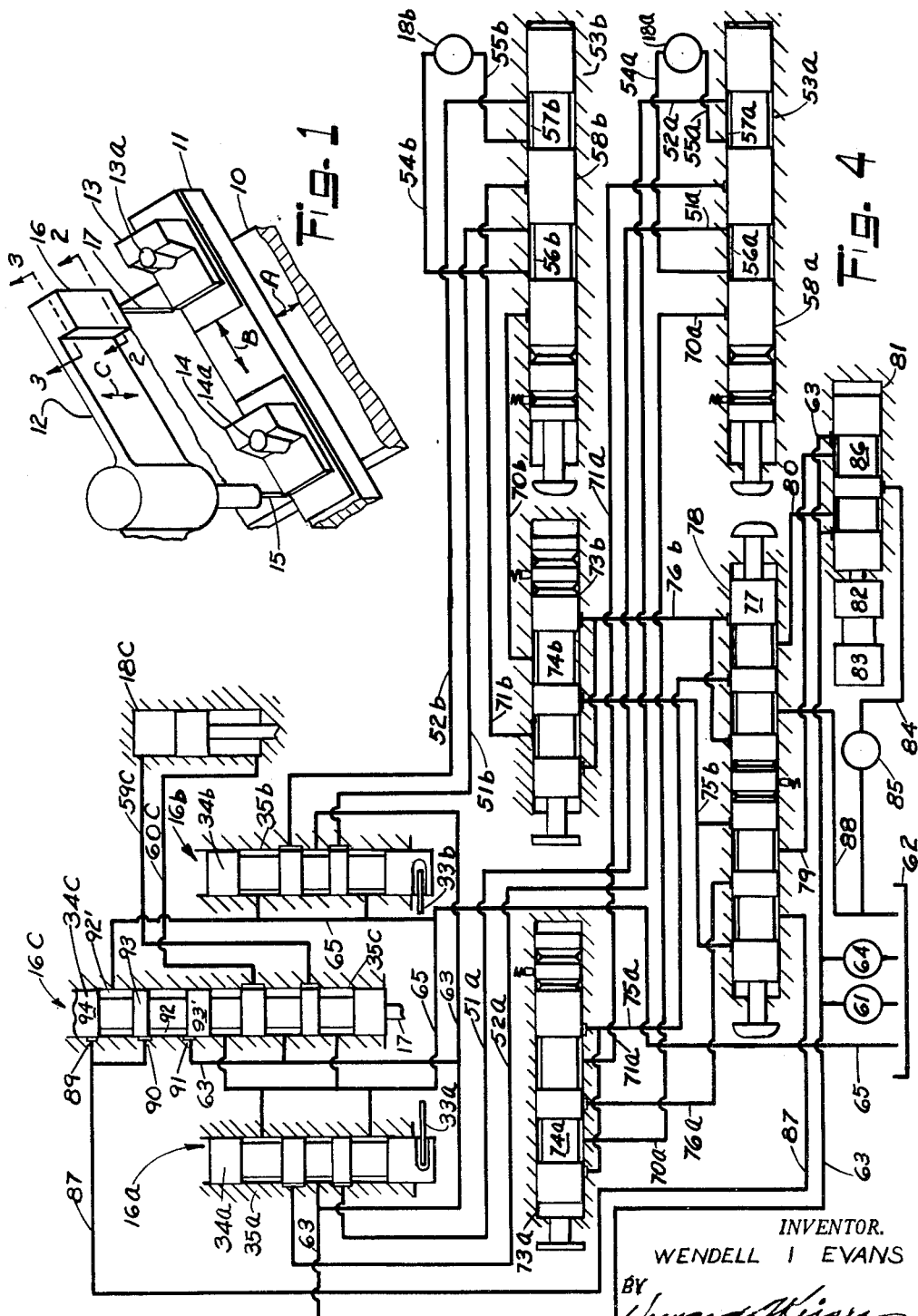
June 30, 1964 W. I. EVANS 3,139,002
TRACER SYSTEM AND MECHANISM THEREFOR
FOR PROFILE OR SCANNING OPERATIONS
Filed March 1, 1961 2 Sheets-Sheet 1
INVENTOR.
WENDELL I EVANS
ATTORNEYS

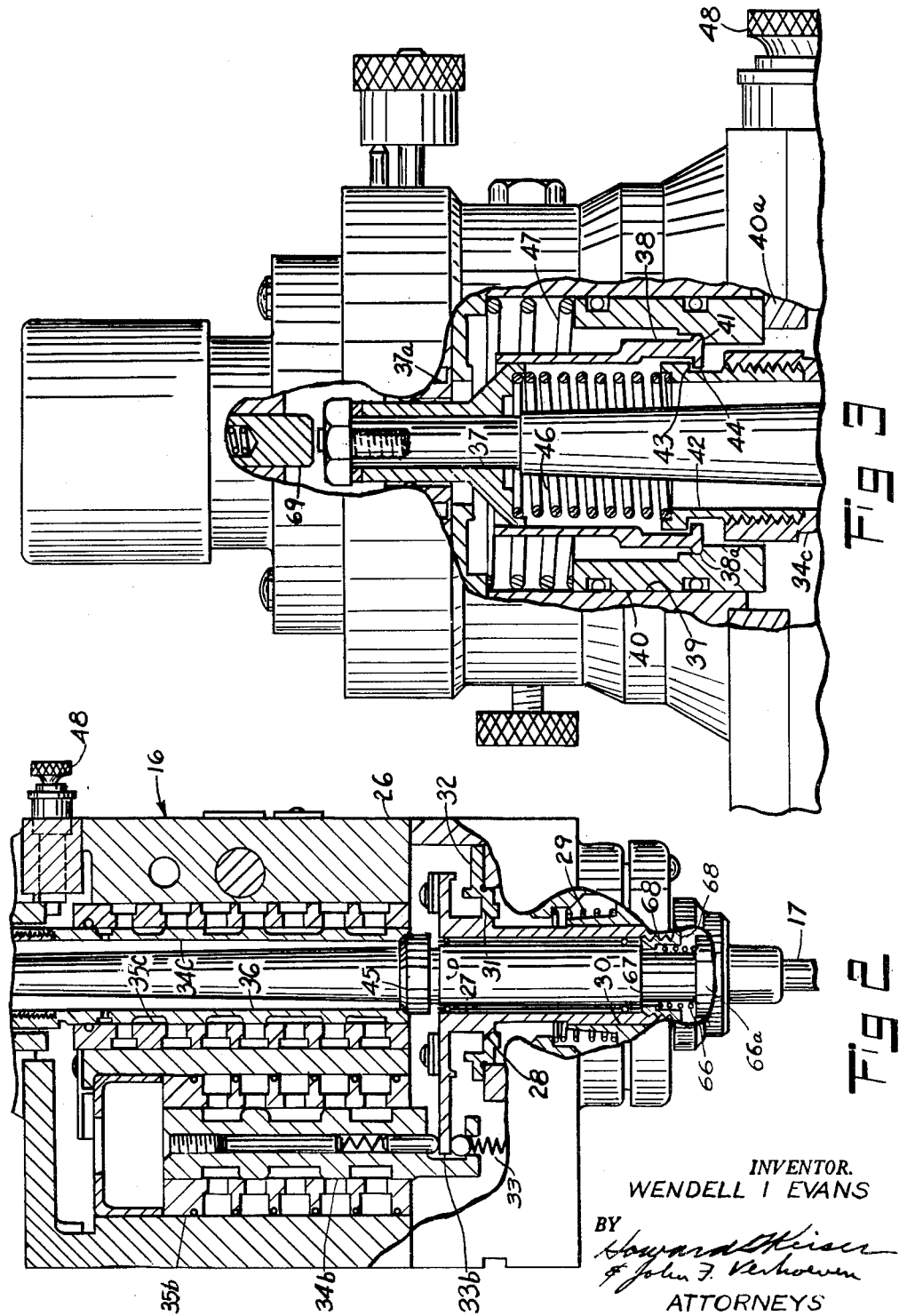

The present invention relates to a tracer system and mechanism thereof suitable for either profile or scanning operations.

In the tracer mechanism of a system designed for profile operations, generally two valve members in the mechanism respond to lateral deflection of a tracer member, or stylus, to control two motors which are connected, respectively, to two movable members, or slides. These two tracer controlled slides provide relative universal movement between the stylus and the pattern in a plane normal to the stylus axis, the direction of relative movement in this plane being determined by the direction of lateral deflection of the tracer stylus. If the stylus is shiftable axially, as well as deflectable laterally, a third valve member can be provided which responds to axial movement only of the stylus to control a third motor connected to a third movable member, or slide. This third tracer controlled slide produces relative movement between the stylus and the pattern in the direction of the stylus axis. If, for example, the three movable members are mutually perpendicular sides in a machine tool, and a cutter and a workpiece are mounted to undergo the same relative universal movement as produced between the tracer stylus and pattern, the conformation of the pattern can be reproduced on the workpiece. In profile operation all relative movement between the cutter and the workpiece is controlled by movement of the tracer stylus as it follows the contours of the pattern.

In some operations, however, it is desirable to scan the pattern progressively instead of following the contours thereof with the tracer member. In scanning, one of the two slides which produce relative universal movement in a plane normal to the axis of the stylus reciprocates in strokes of predetermined length (which may be considered a relative longitudinal movement), and the other slide remains stationary during the longitudinal movement of the reciprocating slide and progresses, by incremental movement of predetermined amount and direction (which may be considered a cross movement) between strokes. While the rate of movement of the reciprocating slide is controlled by the tracing mechanism, it is only the slide producing relative movement in the direction of the axis of the tracing stylus (which may be considered elevational movement) which is under full control of the tracer mechanism in progressive scanning operations, and this slide raises and lowers the cutter relative to the workpiece in accordance with the contour of the pattern along the traversing path.

The contour of the pattern along the traversing path may contain steep rises which, when contacted by the tracer stylus, produce deflection but little or no axial movement of the stylus. Therefore, a tracing mechanism in which elevational movement is produced by axial movement only of the stylus is generally unsatisfactory for progressive scanning operations.

It is an object of the present invention to provide a tracer mechanism and system suitable for both profiling operations and scanning operations. With the present invention lateral deflection of the tracer stylus may be utilized to control relative universal movement in a plane normal to the axis of the stylus, for profiling operations, or may be used to produce relative movement in the direction of the axis of the tracer stylus, for scanning operations. By utilizing lateral deflection of the stylus, instead of axial movement only of the stylus, to control elevational movement in scanning operations, steep rises on the pattern along the traversing path can be climbed.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 1 is a view in perspective showing a tracer mechanism and cutter mounted on one slide, and a pattern and workpiece mounted on another slide;

FIG. 2 is a view taken on line 2—2 of FIG. 1, broken away and partly in cross-section, of the lower portion of a tracer mechanism constructed in accordance with the present invention;

FIG. 3 is an enlarged view, taken on line 3—3 of FIG. 1, showing the upper portion of the tracer mechanism of FIG. 2; and FIG. 4 is a schematic diagram of a hydraulic circuit to effect movement of the slides shown in FIG. 1 for profiling or scanning.

There is shown in FIG. 1 portions of three mutually perpendicular slides 10, 11, and 12 which may, for example, be the cross saddle, table, and vertical ram, respectively, of a milling machine. The table 11 has a pattern 13 and a workpiece 14 mounted thereon, and the ram 12 supports a rotatable cutter 15 and a tracer mechanism 16. The tracer mechanism 16 has a vertical depending tracing member, or stylus, 17 adapted to engage the pattern 13 as the cutter 15 engages the workpiece 14. The table 11 is mounted on the saddle 10 and a hydraulic motor 18a connected to the saddle imparts reversible movement in the direction of arrow A (which may be considered a cross movement) to the saddle, table, and the workpiece and pattern mounted on the table. Reversible movement in the direction of arrow B (which may be considered a longitudinal movement) is imparted to table 11, and the workpiece and pattern mounted thereon, by hydraulic motor 18b and connected to the table. Thus movement of the slides 10 and 11, by motors 18a and 18b respectively, provide a relative universal movement in a plane normal to the axis of the stylus between the stylus and the pattern, and provides the same relative universal movement in a plane between the cutter and the workpiece. Reversible movement in the direction of arrow C (which may be considered an elevational movement) is imparted to ram 12 by hydraulic motor 18c connected to the ram to provide a relative elevational movement in the direction of the stylus axis (which direction is normal to the plane of movement provided by slides 10 and 11) between the stylus and the pattern and to provide the same relative elevational movement between the cutter and the workpiece. It will be understood that the mounting arrangement shown of the tracer, pattern, cutter, and workpiece, is only one of many possible arrangements which could be utilized in a machine with three mutually perpendicular slides to provide relative universal movement between a tracer stylus and pattern, and to provide the same relative universal movement between a cutter and a workpiece.

The tracer stylus 17 is mounted for axial movement and lateral deflection, or tilt, in the housing 26 of the tracer mechanism 16. As shown in FIGS. 2 and 3, the tracer stylus 17 is received for axial movement in a sleeve 27 which has a spherical surface portion 28. Surface portion 28 is biased by a spring 29 compressed between a portion of housing 26 and a collar 30 on sleeve 27 into a mating seat 31 on ring 32 secured in housing 26. When a lateral force is applied to the lower end of stylus 17, the sleeve and stylus pivot, or tilt, about the center D of spherical surface portion 28 and when an axial force is applied to stylus 17 the stylus is moved axially relative to the sleeve 27.

The sleeve 27 has two laterally extending arms 33a and 33b spaced 90 degrees apart around the stylus and engaged, respectively, with two valve members 34a and 34b. Springs 33, interposed between the base of housing 26 and the underside of each of the arms 33a, 33b tend to bias the arms to a horizontal position and the sleeve 27 to a vertical position. The valve members 34a, 34b are slidably received in valve bushings 35a, 35b secured in housing 26 and constitute the movable members of valve portions 16a and 16b respectively of tracer mechanism 16. Arm 33a and valve member 34a, shown schematically in FIG. 4, are behind the stylus as viewed in FIG. 2, but are similar in construction to the arm 33b and valve member 34b. The arms 33a and 33b extend respectively parallel to the directions A and B, FIG. 1, and the movable valve members connected thereto can be rendered effective to control operation of the motors 18a and 18b of the slides 10 and 11 which move in these directions. With this construction lateral deflection of the spindle into or out of the paper, as viewed in FIG. 2, will deflect only arm 33a to move slide 10 only, and lateral deflection to the right or left will deflect only arm 33b to move slide 11 only. Intermediate lateral deflection of spindle 17 will deflect both arms, the relative deflection of the arms depending on the direction of deflection and both slides will be moved simultaneously to effect a relative movement in a plane normal to the stylus between the cutter and the workpiece (and between the tracer stylus and the pattern) in the direction the stylus is tilted.

A valve member 34c, slidably received in bushing 35c secured in the housing 26, has a central bore 36 through which the stylus 17 extends. Above valve member 34c the stylus has secured thereto a collar 37 (see FIG. 3) which is slidably received in a bearing member 37a laterally shiftable on housing 26. A sleeve 38 is slidably received over the collar for axial movement relative to stylus 17. At the top of the tracer mechanism housing a bore 39 has an annular member 40 slidably received therein. The sleeve 38 is received in member 40 and seats on a shoulder 41 on the inner surface thereof. The sleeve 38 has a bead 38a at its lower end which engages the inner surface of annular member 40 to prevent lateral movement of the sleeve therein but which permits the sleeve to tilt on the seat defined by the shoulder 41. Thus when the stylus 17 is tilted, collar 37, which engages sleeve 38 near its upper end, tilts sleeve 38 on the tilt seat or shoulder 41. The valve member 34c has a threaded nut forming an upwardly extending portion 42 thereof with a laterally extending flange 43. The sleeve 38 has at its lower end a laterally inwardly extending flange 44 in registration with flange 43.

The stylus 17, as shown in FIG. 2, has an arcuate shoulder 45 (defining a spherical surface with center at pivot axis D) which is adapted to engage the lower end of valve member 34c. A compression spring 46 (see FIG. 3) extending between the spindle collar 37 and the extending portion 42 of valve member 34c urges the valve member 34c into shoulder 45. Because of the spherical conformation of shoulder 45, lateral deflection of the stylus which causes tilt thereof about pivot point D will not operate valve member 34c when no other connection is effected between the stylus 17 and valve member 34c, but, instead, valve member 34c will be held fixed, during tilt only of the stylus. But axial movement of the stylus 17 will be imparted to the valve member 34c by shoulder 45 so this shoulder 45 defines a valve actuating member which operates valve member 34c only on axial movement of the stylus. However a second connection between the stylus 17 and the valve member 34c can be selectively effected by the valve actuating member defined by tilt sleeve 38. A spring 47 compressed between the top of the valve mechanism housing 26 and annular member 40 urges that member downwardly in bore 39 into engagement with an eccentric pin 40a. Pin 40a can be rotated by knob 48 selectively to lower or raise annular member 40. When member 40 is raised, to raise tilt sleeve 38 for engagement of sleeve flange 44 with the flange 43 on the extending portion 42 of valve member 34c tilt of stylus 17 will result in axial movement and operation of the valve member 34c. When member 40 is lowered, lowering tilt sleeve 38 to effect disengagement of flanges 43 and 44, tilt of stylus 17 and sleeve 38 will not cause movement of the valve member 34c.

The valve portions 16a, 16b and 16c of tracer mechanism 16 can be connected to the three motors 18a, 18b, and 18c, respectively as shown in FIG. 4. With the tilt sleeve flange disengaged from the flange of valve member 34c so that valve member 34c will not be operated, or moved, by tilt of the stylus, motor 18c will operate in response to axial movement only of stylus 17. The two motors 18a and 18b, when connected to valve portions 16a and 16b, will operate in response to lateral deflection of stylus 17 and thus the three motors will provide universal movement under the control of the tracer mechanism. In this condition of the system, manual profiling can be accomplished with the operator holding the stylus against the pattern as a guide and manually biasing the stylus in the desired direction of movement, along or around any contour of the pattern.

Lines 51a, 52a from valve portion 16a of the tracer mechanism are connected to a selector valve 53a and lines 51b, 52b from valve portion 16b are connected to selector valve 53b. Lines 54a and 55a from the two sides of motor 18a are connected to selector valve 53a and, when the valve is in the profile position as shown, lines 54a, 55a are connected through annular channels 56a and 57a, respectively, defined by the shiftable valve member 58a of the selector valve 53a, to lines 51a and 52a (which by virtue of their connection to lines 54b, 55b, may also be considered motor lines) leading to valve portion 16a. In a similar manner lines 54b and 55b from motor 18b are connected through channels 56b and 57b defined by valve member 58b of selector valve 53b to lines 51b and 52b (which may also be considered motor lines) leading to valve portion 16b. Motor lines 59c and 60c connect valve portions 16c to the two sides of motor 18c.

A pump 61 takes hydraulic fluid from sump 62 and supplies it under pressure to pressure line 63, a relief valve 64 being connected to line 63 for discharge into sump 62. Each of the valve portions 16a, 16b, 16c is connected to pressure line 63 and a return line 65 which leads to sump 62. Each of the valve portions 16a, 16b and 16c (which portions include the movable valve members 34a, 34b, 34c respectively and bushings 35a, 35b, 35c, respectively, fixed in the tracer mechanism housing) operate as reversing valves and each of the movable valve members 34a, 34b, and 34c thereof have a central, or null, position (shown in FIG. 4). When the tracer mechanism stylus 17 is in the vertical position, the arms 33a and 33b are horizontal, and valve members 34a and 34b are held in the null position as shown. The stylus 17 is urged downwardly by spring 66 compressed between collar 66a on the stylus and an adjustable stop member 68 threadedly received in sleeve 27. Downward movement of the stylus is limited by engagement of shoulder 67 thereon with the top of adjustable stop member 68. Free upward movement of the stylus is limited by the set position of a spring biased plunger 69 in the top of this housing, but additional upward movement of the stylus is possible when a manual axial biasing force is applied thereto to overcome the resistance of the spring biased plunger 69. When stylus 17 is disengaged from the pattern, and the shoulder 67 is therefore engaged with stop member 68, the valve member 34c is below its null, or central, position. Engagement of stylus 17 with the pattern will shift stylus 17 axially and raise valve member 34c to its null position as shown in FIG. 4.

The valve members 34a, 34b and 34c have spools which block the ports connected to the motor lines when the valve members are in the null or central position to stop the motors and slides. The valve members also define channels which connect one motor line to the pressure line and the other motor line to the return line when moved in either direction from the null or central position, the motor lines connected to pressure and return being determined by the direction of movement of the valve members so that slides are moved in one direction or the other as the valve members are moved in one direction or the other from the null position.

With the system in condition for profile tracing, and the stylus above, and disengaged from the pattern, valve member 34c will be below its null position. Motor line 59c will be connected to pressure line 63 and motor line 60c will be connected to return line 65 through valve portion 16c. Motor 18c will therefore lower slide 12 until stylus 17 engages the pattern and is moved axially an amount to raise valve member 34c to the central or null position and stop motor 18c. Thereafter, the stylus 17 is manually deflected to produce the desired motion in the plane normal to the stylus axis. For example, if it is desired to machine around the edge of boss 14a to remove any irregularities which may have been left after a progressive scanning operation on the piece, the stylus 17 is manually deflected laterally toward the boss 13a on pattern 13. Lateral deflection of the stylus operates one or both of valve members 34a and 34b to control motors 18a and 18b and effect relative motion between the stylus and the pattern in accordance with the direction of deflection. In the position of stylus 17 and boss 13a shown in FIGURE 1, deflection of stylus 17 laterally toward the center of boss 13a will tilt the stylus to lower both valve members 34a and 34b. Pressure line 63 will be connected through valve portion 16a to motor line 51a and 54a to move slide 10 away from the viewer in direction A (FIG. 1). Pressure line 63 will also be connected through valve portion 16b to motor line 51b and 54b to move slide 11 to the left as viewed in FIG. 1. With the particular mounting shown in FIG. 1 for illustrative purposes, lateral deflection of the stylus toward boss 13a produces actual movement of boss 13a toward spindle 17 (and movement of boss 14a toward cutter 15) to effect the desired relative movement between the stylus and the pattern (and the cutter and the workpiece) in accordance with the deflection of the stylus.

When the stylus engages the boss, lateral deflection of the stylus will be reduced, raising valve members 34a and 34b. At that time the operator, while urging the stylus against the boss, also deflects the stylus tangentially to effect a relative circumferential movement between the cutter and the workpiece boss. As the stylus 17 encircles the edge of the boss the operator moves the stylus axially in accordance with the elevation of the surface of the pattern and valve member 34c is raised or lowered accordingly in response to axial movement of the stylus to operate motor 18c and raise and lower slide 12. Thus when the system is conditioned for profile tracing, all of the slide motors are under full control of the tracer mechanism. Motors 18a and 18b respond to lateral deflection only of the tracer stylus 17 and motor 18c responds to axial movement only of the tracer stylus.

When the annular member 40 is raised by rotation of knob 48, and selector valve members 58a and 58b are shifted to scan position to the left of the position shown, the tracer system is conditioned for progressive scanning. A progressive scanning operation might be used, for example, to machine down a casting before profiling is used to finish portions of the piece. The valve members 34a and 34b which, in profile operation, control the slides 10 and 11 and hence the relative movement between the tracer stylus and the pattern in a plane normal to the tracer stylus, are rendered ineffective in the progressive scanning operation. Instead, one slide, such as 11, is reciprocated in strokes of fixed predetermined length and the other slide such as 10, is moved incrementally a predetermined amount between strokes. The slide, such as 12, which produces relative elevational movement between the tracer stylus and the pattern remains under the control of valve member 34c which, for progressive scanning, is conditioned for actuation in response to tilt of the stylus. Although, in progressive scanning, the extent of movement of slide 11 is not controlled by the tracer mechanism, the rate of movement thereof is controlled by valve member 34c so that elevational movement (in direction C) is coordinated with longitudinal movement (in direction B) and slopes of different steepness can be climbed. With the tracer system of FIG. 4 conditioned for progressive scanning, valve members 34a and 34b are rendered ineffective to control motors 18a and 18b since lines 51a, 51b and lines 52a, 52b are blocked at the selector valves 53a, 53b. Lateral deflection of the tracer stylus operates motor 18c since valve member 34c is engaged with the tracer stylus to respond not only to axial movement thereof (through shoulder 45) but lateral movement as well (through collar 37, tilt sleeve 38, and flanges 44, 43).

With motors 18a and 18b disconnected from the valve members 34a and 34b, other means are provided to operate these motors to effect a relative progressive scanning between the tracer stylus and the pattern, and hence the cutter and the workpiece. Scanning in a plane normal to the stylus can be effected either by longitudinal passes (by slide 11) in direction B and incremental cross movement between passes (by slide 10) in direction A or by longitudinal passes in direction A and incremental cross movement between passes in direction B, depending on which extreme position valve member 77 of valve 78 is set. It will be assumed the valve member 77 is set in the left hand position to select a scanning operation in which longitudinal passes are made by slide 11, with incremental cross movement between passes produced by slide 10. With selector valves 53a, 53b set to the left in their scan positions, motor 18a is connected through lines 54a, 55a, and channels 56a, 57a, of valve member 58a, to lines 70a, 71a which terminate at directional valve 73a. The valve member 74a thereof will be set to the left or right of the position shown, depending on the desired direction of incremental progression of the cross slide 10, so that one side of the cross feed motor 18a will be connected to line 75a and the other side thereof to line 76a. The valve member 74a will remain in one position throughout the scanning operation. With valve member 77 of valve 78 set to the left of the position shown, line 76a is connected to line 79 while line 75a is connected to line 80. Lines 79 and 80 terminate at a pickfeed valve 81 having a solenoid 82 which is energized for a predetermined time at the end of each pass of the traversing slide 11. Dogs on table 11 operate timer 83 which is electrically connected to energize solenoid 82. Pressure line 63 and a return line 84, containing rate valve 85, are connected to valve 81 and when solenoid 82 is deenergized both lines 79 and 80 are connected to pressure line 63. This puts both sides of motor 18a under pressure to stop the motor during a traversing pass of slide 11. At the end of each pass solenoid 82 is energized to shift valve member 86 to the right. This connects line 80 to return line 84 and maintains the connection between line 79 and pressure line 63 to effect an incremental operation of motor 18a and incremental movement of slide 10.

With the selector valve members 58a, 58b in the left hand, or scan, position for progressive scanning, motor line 54b is connected, through channel 56b, to line 70b, and motor line 55b is connected, through channel 57b, to line 71b. Lines 70b and 71b terminate at direction valve 73b, the movable member 74b of which is shifted from one extreme position to the other by dogs on table 11 at the end of each pass to reverse motor 18b and table 11. When valve member 74b is in one of its extreme positions one of the lines 70b, 71b is connected to line 75b and the other is connected to line 76b. With valve member 77 of valve 78 in the left hand position, line 75b is connected to line 87 and line 76b is connected to a return line 88. Line 87 is connected to two ports 89 and 90 in the bushing 35c of valve portion 16c while pressure line 63 is connected to an adjacent port 91. When valve member 34c is in the null position as shown in FIG. 4, or a predetermined distance therefrom on either side of the null position, pressure line 63 is connected through port 91, annular channel 92 on the valve member 34c, and port 90 to line 87 so that pressure is transmitted through line 87, line 75b to either lines 71b, 55b to one side of the motor 18b or to lines 70b, 54b, to the other side of the motor. The side of the motor not connected to pressure is connected to return line 88 through line 76b and either lines 71b, 55b or lines 70b, 54b. As valve member 34c moves in one direction or the other from the null position, spool 93 or 93', between which annular channel 92 extends, will offer an increasing resistance to flow so that motor 18b is slowed down. While valve member 34c is positioned to pass fluid under pressure through channel 92 to line 87, ports 89 and 90 are blocked by spools 94 and 93, respectively, from annular channel 92' extending therebetween. Additional movement of valve member 34c in either direction effects connection of line 87 to annular channel 92' through either port 89 or 90. Annular channel 92' is connected to return line 65 so that when valve member 34c moves a predetermined amount in either direction from the null position, line 87, and the motor line 54b or 55b connected thereto, is connected to the sump. Since the other side of motor 18b is connected to the sump through line 88, the motor will stop. Thus when valve member 34c is in the null position as shown, motor 18b is moving the table 11 at its maximum rate and motor 18c is stopped to hold slide 12 stationary. As the valve member 34c moves in one direction or the other from the null position, motor 18c starts to run and increases speed as motor 18b slows down, by virtue of the throttling effect of spool 93 or 93'. The steeper the contour encountered by stylus 17, the greater will be the movement of valve member 34c from the null position so the coordinated operation of motors 18b and 18c through valve member 34c permits the stylus 17 to climb slopes of any steepness during progressive scanning operations. When flanges 42 and 43 are engaged, spring 46 (in addition to springs 33) biases the stylus to a vertical position so that when the contour of the pattern in the scanning path flattens out, the stylus moves toward the vertical position. This moves valve member 34c toward the null position to reduce the speed of motor 18c and increase the speed of motor 18b.

Thus the mechanism can be conditioned for progressive scanning by rendering valve portions 16a and 16b ineffective to control motors 18a and 18b and conditioning the tracer mechanism to make valve portion 16c responsive to lateral deflection as well as axial movement. As slide 11 reciprocates longitudinally under control of reversing valve 73b, the stylus will be moved either axially or laterally or both, depending on the contour of the pattern in the path of the stylus, without manual biasing by the operator. Either type of stylus movement will operate motor 18c and control the rate of operation of motor 18b in coordination with operation of motor 18c, to cause the stylus to follow the contour of the pattern and thereby cause the cutter to move in accordance with the pattern.

What is claimed is:

1. A tracer mechanism comprising in combination a housing, an elongated tracer stylus, means to mount said tracer stylus in the housing for axial movement and tilting movement, first and second valve members mounted in the housing in spaced relation around the tracer stylus and connected thereto ninety degrees apart for movement in response to tilting movement thereof, a third valve member mounted in the housing and movable in the axial direction of the tracer stylus, a first valve actuating member on the stylus adapted to engage said third valve member to effect movement thereof on axial movement of the stylus, said first valve actuating member ineffective to move said third valve member on tilting movement of the tracer stylus, a second valve actuating member mounted on the stylus and extending laterally therefrom for tilting therewith, and means to effect relative axial shifting between said second valve actuating member and said third valve member to effect engagement and disengagement therebetween for selective connection of said third valve member to the tracer stylus for movement in response to tilting movement thereof.

2. In a tracer mechanism having a housing and a tracer stylus mounted in the housing for axial and tilting movement, the tracer mechanism having first and second valve members mounted in the housing for movement in response to tilting movement of the tracer stylus, the combination therewith of a third valve member mounted coaxially with the tracer stylus and having a laterally extending flange, an arcuate shoulder on the tracer stylus in engagement with said third valve member to hold said valve member in a fixed position as the tracer stylus tilts and to move said valve member with the tracer stylus as the tracer stylus moves axially, a sleeve slidably mounted on the tracer stylus and tiltable therewith, said sleeve having a laterally extending flange in registration with the flange on the third valve member, an annular member mounted in the housing and encircling the tracer stylus to define a tilt seat for said sleeve, said annular member shiftable axially selectively to effect engagement between the sleeve flange and the third valve member flange for movement of said third valve member in response to tilt of said tracer stylus and sleeve and alternately to effect disengagement of said flanges to render the third valve member unresponsive to tilt of the tracer stylus.

3. In a tracer system adapted to control three slide motors in a machine to effect universal movement between a tracer mechanism and a pattern and to effect corresponding universal movement between a cutter and a workpiece, the tracer mechanism having a tracer stylus mounted for axial movement and tilting movement and having two valve members connected to the stylus for operation of two of said slide motors in response to tilting movement of the tracer stylus to effect relative universal movement between the tracer mechanism and the pattern and between the cutter and the workpiece in a plane normal to the stylus, the combination comprising, a third valve member mounted coaxially with said tracer stylus and hydraulically connected to the third slide motor for operation thereof in response to movement of said third valve member to effect relative movement between the tracer mechanism and the pattern and between the cutter and the workpiece in a direction normal to said plane, a first valve actuating member on the stylus adapted to engage said third valve member and hold the third valve member in a fixed position on tilt of the tracer stylus, said first valve actuating member moving the third valve member on axial movement of the tracer stylus, a second valve actuating member slidably received on the tracer stylus and tiltable therewith, said second valve actuating member adapted to engage said third valve member for movement thereof in response to tilt of said tracer stylus, means selectively to shift said second valve actuating member out of engagement with said third valve member, means to render said first and second valve members ineffective to control said two slide motors when said second valve actuating member is engaged with said third valve member, and means to operate said two slide motors when said first and second valve members have been rendered ineffective to effect a progressive scanning between the tracer mechanism and the pattern and between the cutter and the workpiece.

4. A tracer mechanism comprising in combination a housing, an elongated tracer stylus mounted in the housing and biased to a predetermined position therein, said stylus axially movable and tiltable relative to said predetermined position, first and second valve members mounted in the housing in spaced relation around the tracer stylus and connected thereto ninety degrees apart for movement in response to tilting movement thereof, a third valve member mounted in the housing coaxial with the stylus when the stylus is in said predetermined position, said third valve member movable in the axial direction of the tracer stylus, means defining a shoulder on the stylus engaged with said third valve member to effect movement thereof on axial movement of the stylus, said shoulder ineffective to move said third valve member on tilting movement of the tracer stylus, and a sleeve mounted on the stylus for tilting therewith, said sleeve shiftable selectively on the stylus between a position to engage said third valve member for operation thereof in response to tilt of the stylus and a position disengaged from said third valve member.

References Cited in the file of this patent

UNITED STATES PATENTS

| | | |
|---|---|---|
| 2,332,533 | Roehm | Oct. 26, 1943 |
| 2,471,097 | Doll et al. | May 24, 1949 |
| 2,745,624 | Turchan | May 15, 1956 |
| 2,749,810 | Turchan | June 12, 1956 |
| 3,045,435 | Weaver | July 24, 1962 |
| 3,081,060 | Thomas | Mar. 12, 1963 |

FOREIGN PATENTS

| | | |
|---|---|---|
| 974,218 | Germany | Oct. 20, 1960 |